United States Patent [19]
Fleischmann

[11] Patent Number: 5,958,226
[45] Date of Patent: Sep. 28, 1999

[54] STORM DRAIN FILTER WITH REMOVABLE DEBRIS TRAY

[76] Inventor: Charles R. Fleischmann, 164 Danefield Pl., Moraga, Calif. 94556

[21] Appl. No.: 09/135,909

[22] Filed: Aug. 18, 1998

Related U.S. Application Data

[63] Continuation-in-part of application No. 08/999,083, Dec. 29, 1997, abandoned.

[51] Int. Cl.$^6$ .................................. E03F 5/06; C02F 9/00
[52] U.S. Cl. .......................... 210/165; 210/232; 210/238; 210/282; 210/337; 210/489
[58] Field of Search ................................ 4/289, 290, 291; 52/11, 12; 210/162, 163–166, 232, 238, 282, 299, 337, 314, 483, 488, 489

[56] References Cited

U.S. PATENT DOCUMENTS

| | | |
|---|---|---|
| 616,364 | 12/1898 | Shreeve . |
| 2,095,241 | 10/1937 | Cox . |
| 3,111,489 | 11/1963 | Getzin . |
| 3,628,668 | 12/1971 | Huppert . |
| 4,112,691 | 9/1978 | Ebeling et al. . |
| 4,320,540 | 3/1982 | Leavens . |
| 4,343,702 | 8/1982 | Riedel . |
| 4,443,897 | 4/1984 | Austin . |
| 4,776,722 | 10/1988 | Gaudin . |
| 5,019,346 | 5/1991 | Richter et al. . |
| 5,284,580 | 2/1994 | Shyh . |
| 5,397,464 | 3/1995 | Hannon . |
| 5,480,254 | 1/1996 | Autry et al. . |
| 5,482,624 | 1/1996 | Swiatek et al. . |
| 5,632,889 | 5/1997 | Tharp . |
| 5,720,574 | 2/1998 | Barella . |
| 5,744,048 | 4/1998 | Stetler . |
| 5,788,849 | 8/1998 | Hutter, Jr. et al. . |

OTHER PUBLICATIONS

Kristar Enterprises "Drop In" Fossil Filter Brochure, Sep. 1996.

*Primary Examiner*—Jay H. Woo
*Assistant Examiner*—Fred Prince
*Attorney, Agent, or Firm*—Jack Lo

[57] ABSTRACT

A storm drain filter is sized to cover the opening of a storm drain. It includes a top debris tray removably positioned within a bottom media tray. Each tray includes a peripheral trough surrounding a central overflow opening. The top tray is shorter in height than the bottom tray, so that a filter media receiving chamber is defined between the top tray and the bottom tray. Filter media is positioned in the filter media receiving chamber. A handle is attached across the central overflow opening of the top tray. In a first embodiment, the bottom surfaces of the top and bottom trays are perforated. In a second embodiment, the inner walls of the top and bottom trays are perforated. In either embodiment, water flowing into the filter is distributed around the top trough, passed through the perforated surface of the top tray, the filter media, the perforated surface of the bottom tray, and into the storm drain. Hydrocarbons and other contaminants are filtered by the filter media. Large particles and debris are collected in the trough of the top tray. The filter may be easily cleaned by lifting out the top tray, shaking out the debris, and replacing it in the bottom tray. The removable top tray also enables easy inspection or replacement of the filter media.

10 Claims, 5 Drawing Sheets

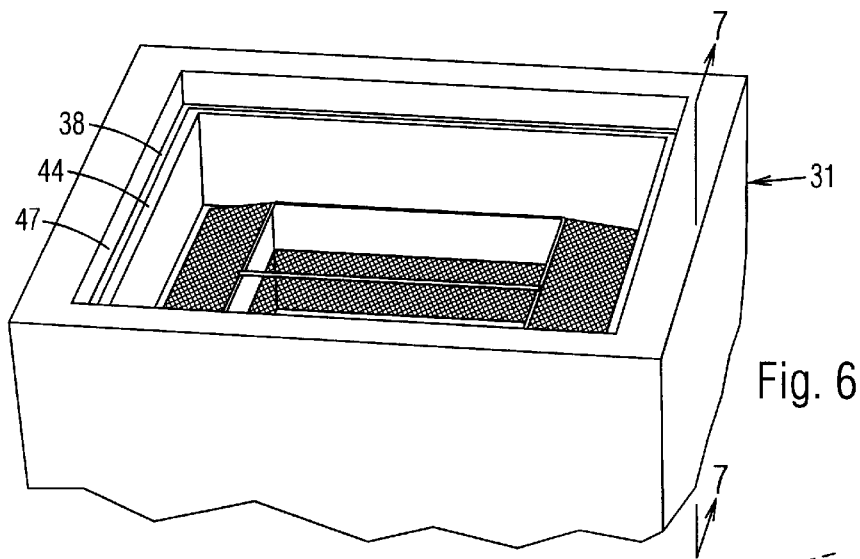
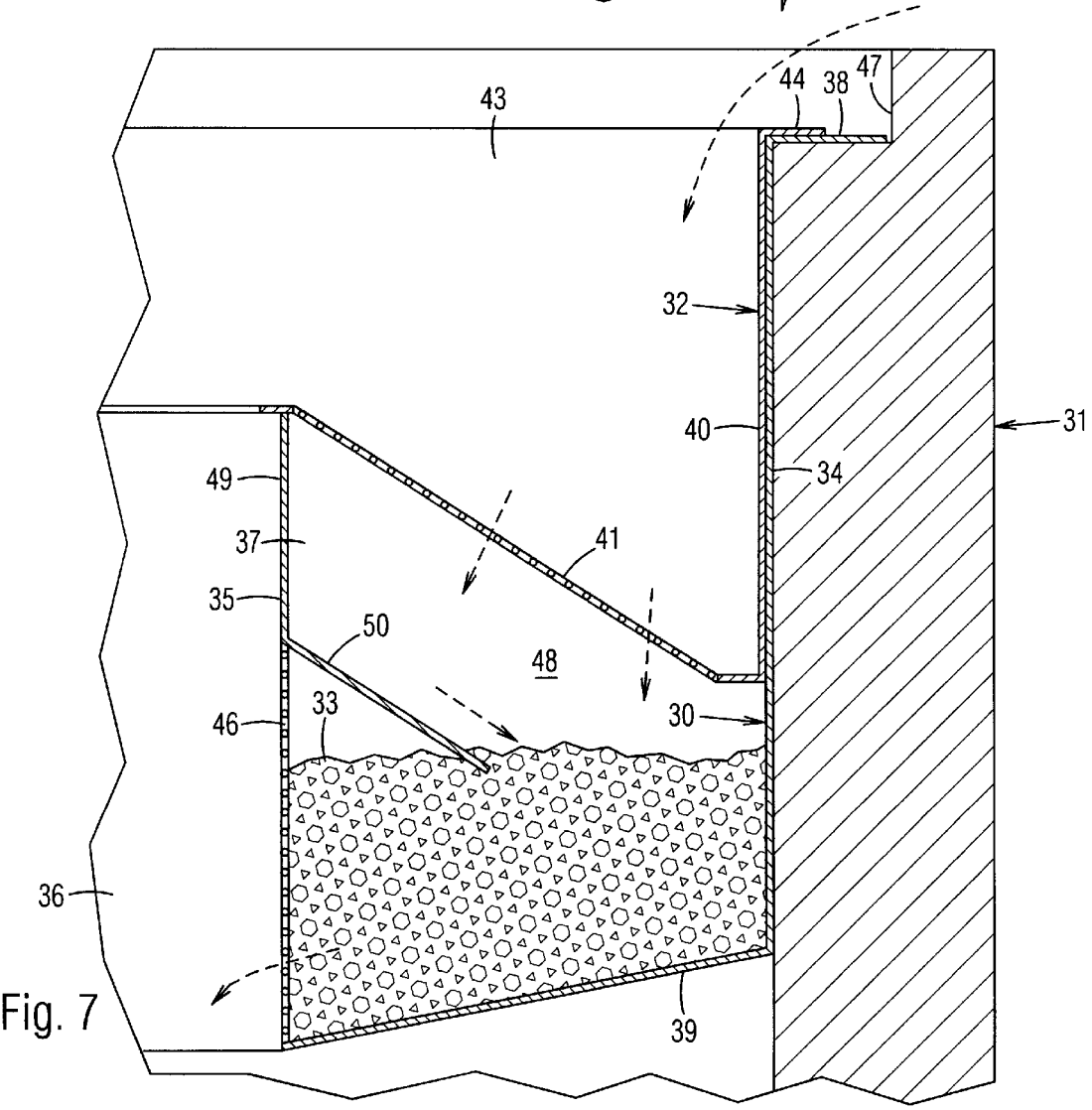

STORM DRAIN FILTER WITH REMOVABLE DEBRIS TRAY

CROSS REFERENCE TO RELATED APPLICATIONS

This is a continuation-in-part of application Ser. No. 08/999,083, filed Dec. 29, 1997, now abandoned.

BACKGROUND OF THE INVENTION

1. Field of the Invention

This invention relates generally to filters for filtering debris, hydrocarbons, and other contaminants from water flowing into storm drains.

2. Prior Art

Storm drains are provided in streets, parking lots, gas stations, and highways for draining water runoff. Some storm drains are provided with internal filters for preventing debris, hydrocarbons, and other contaminants from entering waterways.

U.S. Pat. No. 5,720,574 to Barella shows a filter positioned inside a storm drain. The filter includes a peripheral trough surrounding a central overflow opening. A set of cartridges containing filter media are positioned in the trough. Water flowing into the drain are distributed around the trough, and pass through the cartridges before exiting through a screen on the bottom of the trough. When water flow is high, excess water overflows through the central opening without passing through the cartridges. However, gravel, leaves, and other debris accumulate on top of the cartridges and block water flow, so that a worker must reach in and dig them out by hand, which is slow and time consuming. It is also cumbersome to open the cartridges and inspect or replace the filter media. U.S. Pat. No. 5,632,889 to Tharp shows a similar filter. U.S. Pat. No. 5,480,254 to Autry et al. shows a storm drain filter that comprises a box with porous vertical walls and an opening on the bottom. It is simply placed over a storm drain, so that storm water is filtered by flowing through the vertical walls of the filter. It is made for temporary use while road surface is being constructed.

U.S. Pat. No. 5,397,464 to Hannon shows a strainer box comprising a perforated basket removably received in a housing. It has no provision for using filter media, so that it cannot filter hydrocarbons and other contaminants. It includes an inlet on one vertical side and an outlet on an opposite vertical side, so that it cannot be used in a storm drain. U.S. Pat. No. 5,069,781 to Wilkes shows a drain with a removable perforated strainer received therein. It also has no provision for using filter media. U.S. Pat. No. 4,717,475 to Brandt et al. shows a filtering device with a pair of filter cartridges received in a housing. Debris collected on top of the cartridges must be removed by hand. A filter sold as the "FOSSIL FILTER" by KriStar Enterprises comprises an annular trough surrounding a central overflow opening. Filter media is positioned between spaced apart top and bottom screens. The top screen is not securely held in place, so that it may be dislodged under strong water flow. Again, debris collected on the top screen must be dug out by hand. The filter is also difficult to open for inspecting or replacing filter media. Other filters are provided with loose filtering media, which can be washed over the central overflow opening and down the drain when the water flow is high and turbulent enough, or when the drain is backed up.

OBJECTS OF THE INVENTION

Accordingly, objects of the present invention are:

to filter out debris, hydrocarbons, and other contaminants from water runoff flowing into a storm drain;

to maximize the filtering rate despite the presence of debris;

to keep the filter media in position even when water flow is high and turbulent, or when the drain is backed up;

to enable easy inspection and replacement of filter media; and to enable debris to be easily and quickly removed.

Further objects of the present invention will become apparent from a consideration of the drawings and ensuing description.

BRIEF SUMMARY OF THE INVENTION

A storm drain filter is sized to cover the opening of a storm drain. It includes a top debris tray removably positioned within a bottom media tray. Each tray includes a peripheral trough surrounding a central overflow opening. The top tray is shorter in height than the bottom tray, so that a filter media receiving chamber is defined between the top tray and the bottom tray. Filter media is positioned in the filter media receiving chamber. A handle is attached across the central overflow opening of the top tray. In a first embodiment, the bottom surfaces of the top and bottom trays are perforated. In a second embodiment, the bottom of the top tray and the inner wall of the bottom tray are perforated. In either embodiment, water flowing into the filter is distributed around the top trough, passed through the perforated surface of the top tray, the filter media, the perforated surface of the bottom tray, and into the storm drain. Hydrocarbons and other contaminants are filtered by the filter media. Large particles and debris are collected in the trough of the top tray. The filter may be easily cleaned by lifting out the top tray, shaking out the debris, and replacing it in the bottom tray. The removable top tray also enables easy inspection or replacement of the filter media.

BRIEF DESCRIPTION OF THE SEVERAL VIEWS OF THE DRAWING

FIG. 6 is a top perspective view of the filter assembled inside a storm drain.

FIG. 7 is a side sectional view of the filter taken along line 7—7 in FIG. 6.

DRAWING REFERENCE NUMERALS

| | |
|---|---|
| 10. Bottom Media Tray | 11. Storm Drain |
| 12. Top Debris Tray | 13. Filter Media |
| 14. Outer Wall of Bottom Tray | 15. Inner Wall of Bottom Tray |
| 16. Central Overflow Opening | 17. Media Trough |
| 18. Flange of Bottom Tray | 19. Perforated Bottom of Bottom |

-continued

| | Tray |
|---|---|
| 20. Outer Wall of Top Tray | 21. Inner Wall of Top Tray |
| 22. Central Overflow Opening | 23. Debris Trough |
| 24. Flange of Top Tray | 25. Handle |
| 26. Perforated Bottom of Top Tray | 27. Shoulder |
| 28. Media Receiving Chamber | 30. Bottom Tray |
| 31. Storm Drain | 32. Top Tray |
| 33. Filter Media | 34. Outer Wall |
| 35. Inner Wall | 36. Central Overflow Opening |
| 37. Trough | 38. Flange |
| 39. Bottom | 40. Outer Wall |
| 41. Slanted Bottom | 42. Central Overflow Opening |
| 43. Trough | 44. Flange |
| 45. Handle | 46. Perforated Lower Portion |
| 47. Shoulder | 48. Media Receiving Chamber |
| 49. Solid Upper Portion | 50. Water Directing Flange |

DETAILED DESCRIPTION OF THE INVENTION

Figure 1:
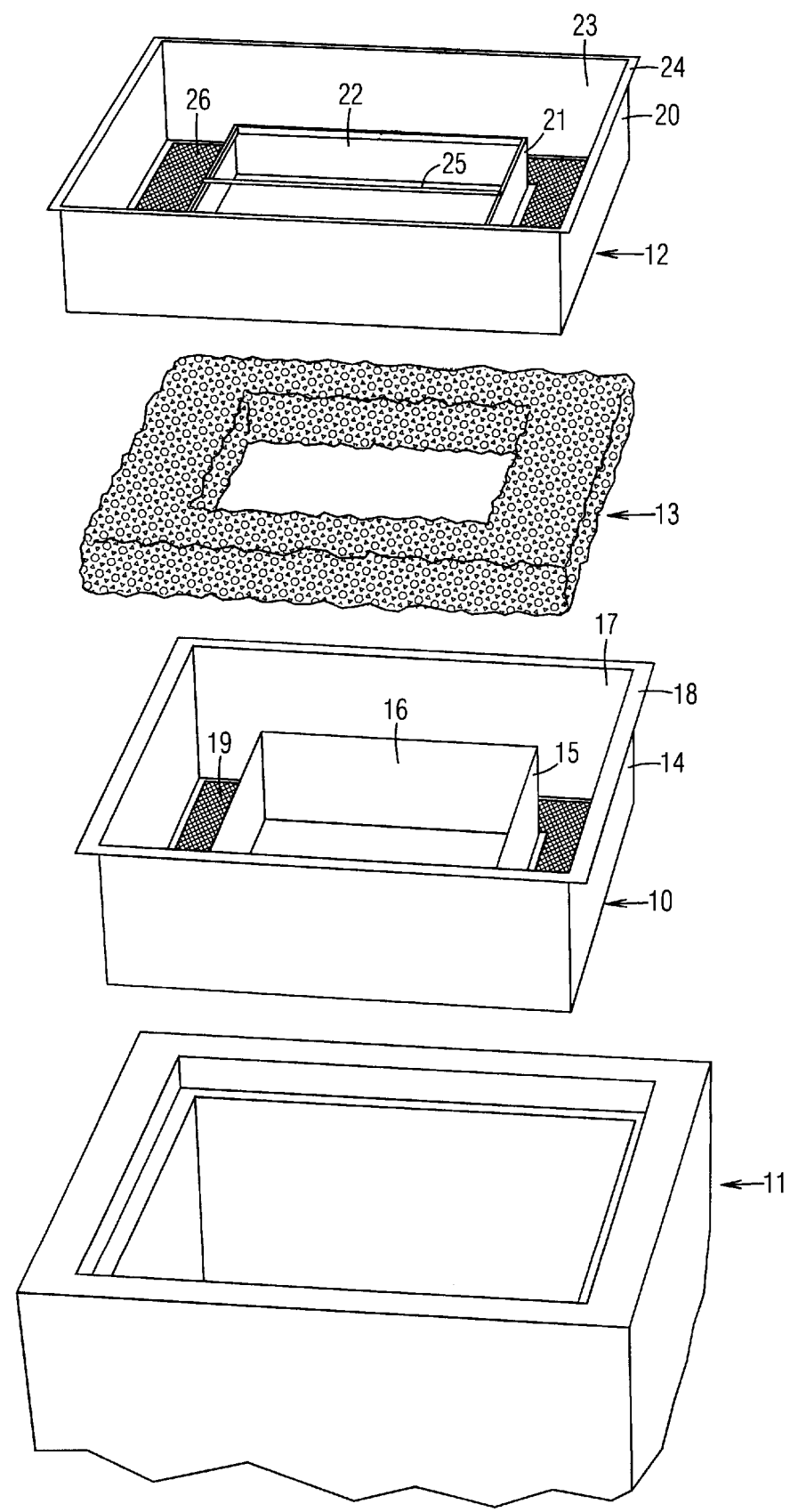
FIG. 1 is a top perspective exploded view of a first embodiment of a storm drain filter with removable debris tray.

FIG. 1:

A first embodiment of the present storm drain filter is shown in a top perspective exploded view in FIG. 1. It includes a bottom media tray 10 sized for positioning within a conventional storm drain 11, a top debris tray 12 for positioning on top of bottom tray 10, and filter media 13 for positioning between top tray 12 and bottom tray 10.

Bottom tray 10 includes a closed vertical outer wall 14, and a shorter, closed vertical inner wall 15, so that a central overflow opening 16 is defined within inner wall 15, and a depressed, peripheral media trough 17 is defined between outer wall 14 and inner wall 15. A supporting flange 18 is arranged around the top rim of outer wall 14. A perforated bottom 19 is arranged around trough 17.

Top tray 12 includes a closed vertical outer wall 20, and a shorter, closed vertical inner wall 21, so that a central overflow opening 22 is defined within inner wall 21, and a depressed, peripheral debris trough 23 is defined between outer wall 20 and inner wall 21. A supporting flange 24 is arranged around the top rim of outer wall 20. A handle 25 is attached to inner wall 21 across opening 22. A perforated bottom 26 is arranged around trough 23. Outer wall 20 and inner wall 21 of top tray 12 are respectively shorter than outer wall 14 and inner wall 15 of bottom tray 10.

Figure 2:
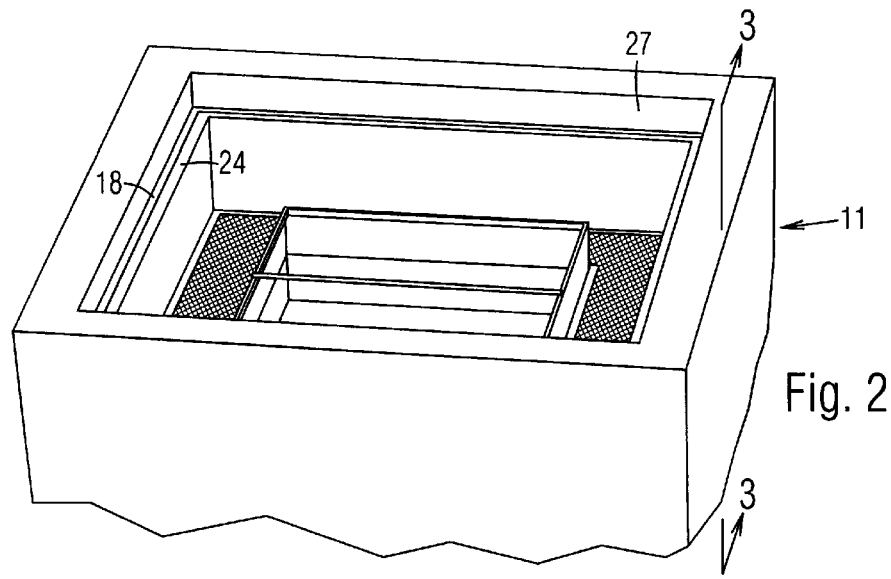
FIG. 2 is a top perspective view of the filter assembled inside a storm drain.

FIG. 2:

The filter is shown assembled and positioned in storm drain 11 in a top perspective view in FIG. 2. Flange 18 is supported on a shoulder 27 of storm drain 11, and flange 24 is supported on flange 18. Storm drain 11 would be installed in the ground (not shown) so that its rim is flush with the ground surface. A grate (not shown) would also be positioned within the opening of storm drain 11 on top of the filter.

Figure 3:
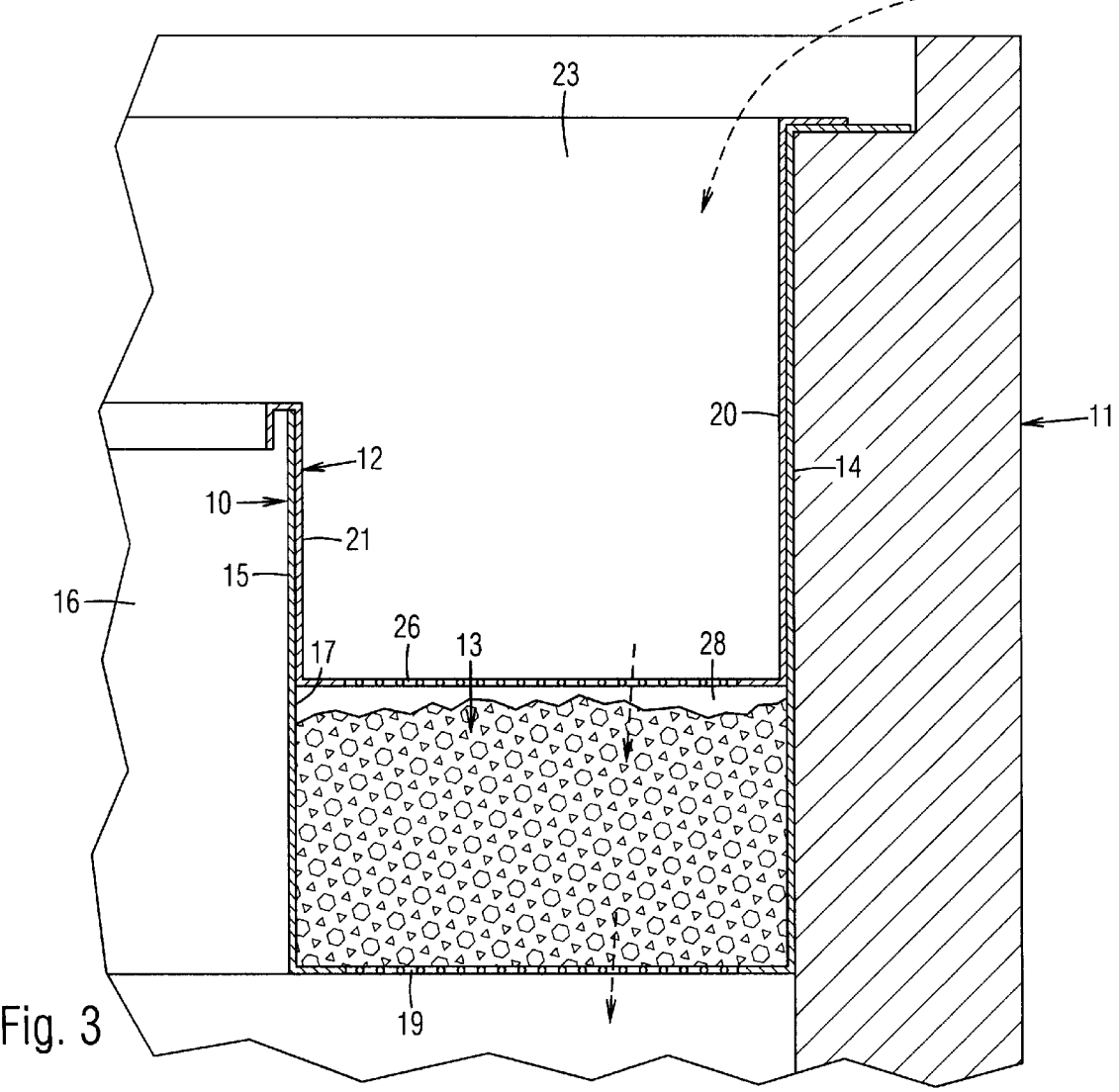
FIG. 3 is a side sectional view of the filter taken along line 3—3 in FIG. 2.

FIG. 3:

The filter is shown in a side sectional view in FIG. 3. Top tray 12 is sized to slide into trough 17 of bottom tray 10. Because top tray 12 is shorter in height than bottom tray 10, a media receiving chamber 28 is defined between perforated bottom 26 of top tray 12 and perforated bottom 19 of bottom tray 10. Loose filter media 13 is positioned in media receiving chamber 28. As indicated by the dashed arrows, water entering storm drain 11 flows into trough 23, passes through perforated bottom 26, filter media 13, perforated bottom 19, central overflow opening 16, and down storm drain 11. Large particles and debris are filtered from the water by perforated bottom 26, and collected within trough 23 of top tray 12. Small particles, hydrocarbons, and other contaminants are filtered by filter media 13. The water is distributed around trough 23, which is large enough so that if some areas are blocked by debris, the water can still drain through other relatively clear areas. Filter media 13 is completely enclosed within media receiving chamber 28, so that it is not dislodged by strong water flow or back flow. When the water flow exceeds the rate at which it may pass through filter media 13, excess water is drained through overflow opening 22.

Figure 4:
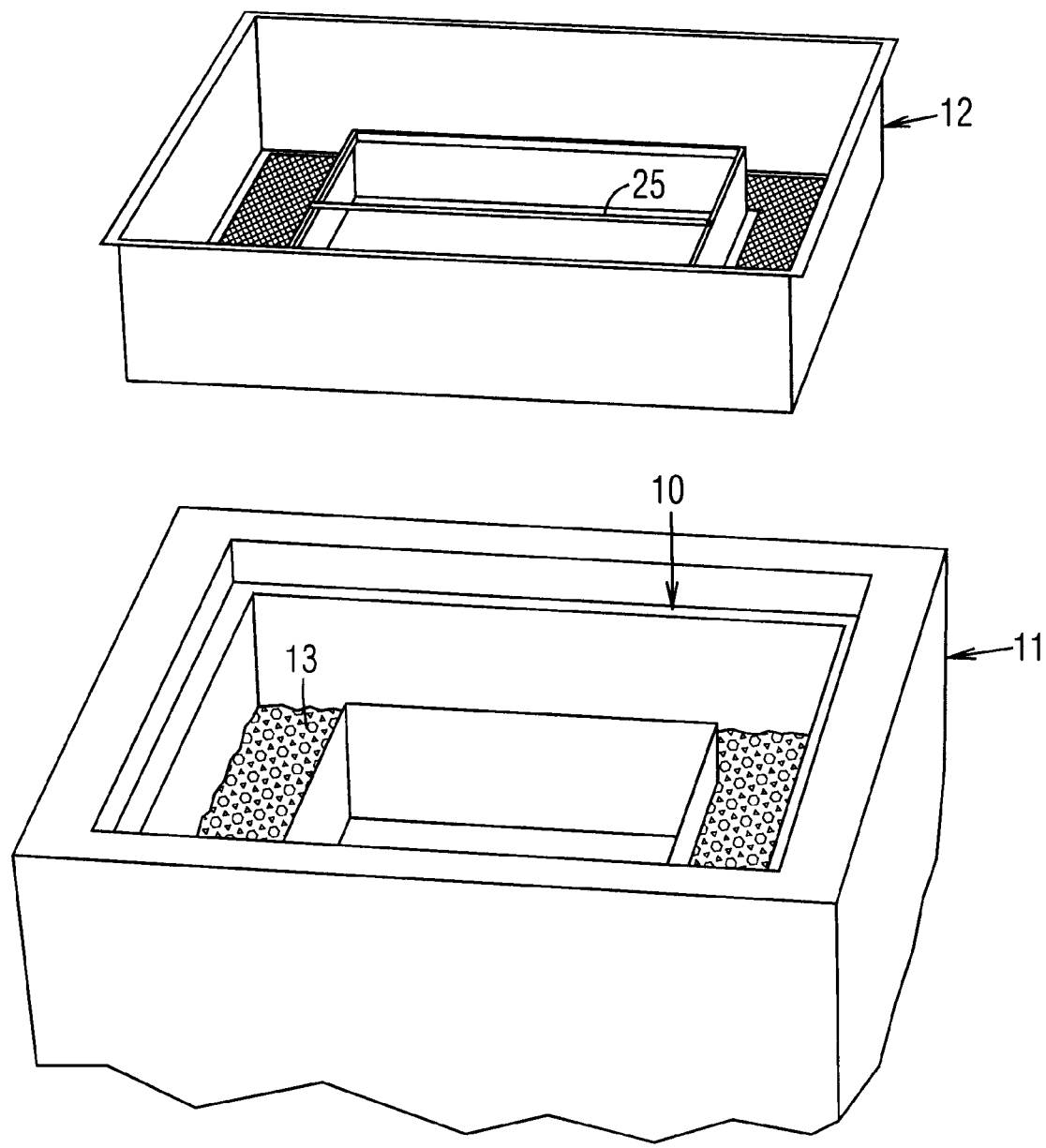
FIG. 4 is a top perspective exploded view of the filter when the debris tray is removed.

FIG. 4:

The filter is shown in a top perspective view in FIG. 4. The filter may be easily cleaned by lifting out top tray 12 by handle 25, overturning it to dump out debris collected therein, and replacing it in bottom tray 10. Filter media 13 may be easily inspected or replaced by removing top tray 12.

Figure 5:
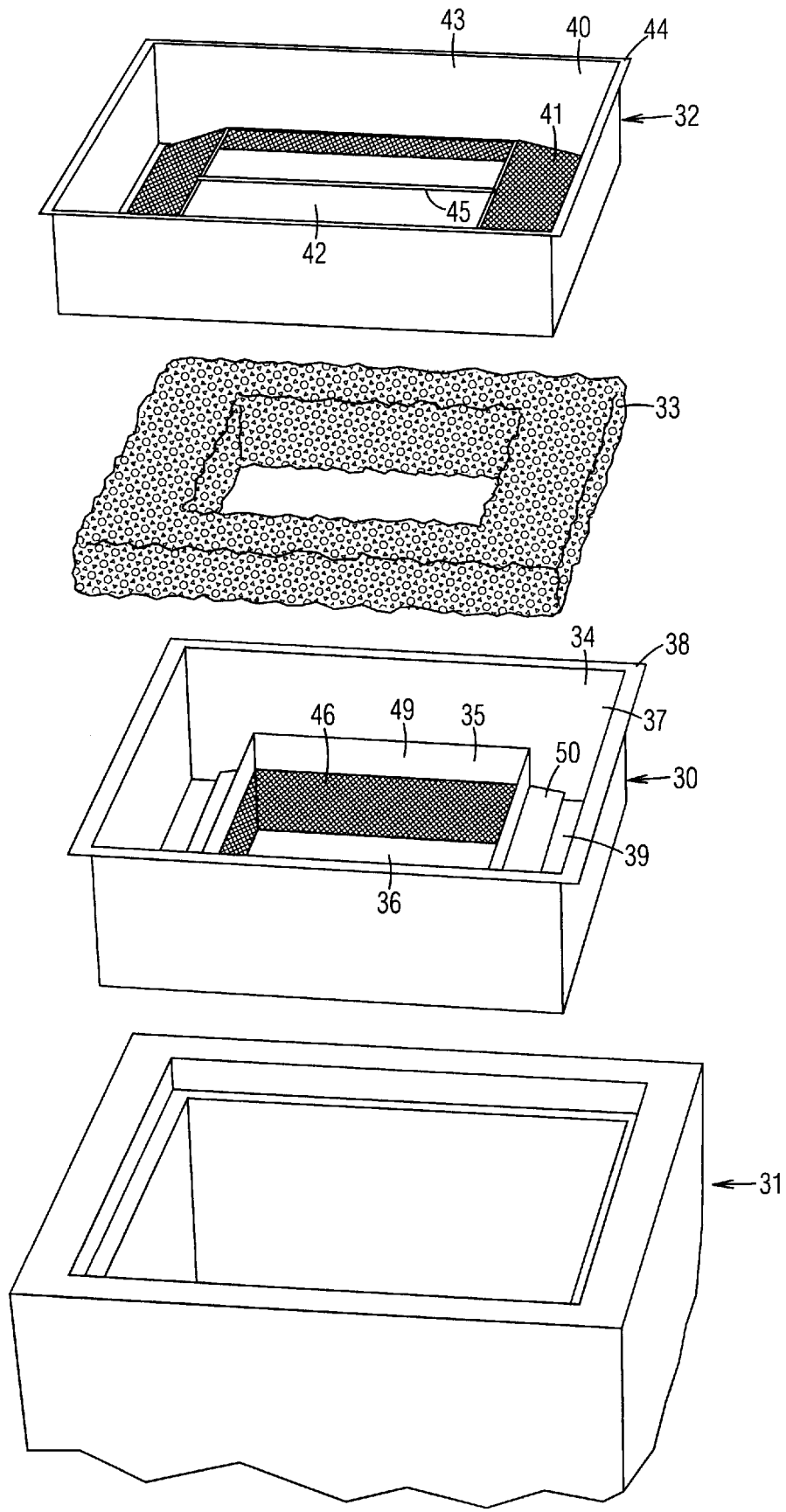
FIG. 5 is a top perspective exploded view of a second embodiment of the storm drain filter.

FIG. 5:

A second embodiment of the present storm drain filter is shown in a top perspective exploded view in FIG. 5. It includes a bottom media tray 30 sized for positioning within a conventional storm drain 31, a top debris tray 32 for positioning on top of bottom tray 30, and filter media 33 for positioning between top tray 32 and bottom tray 30.

Bottom tray 30 includes a closed vertical outer wall 34 and a shorter vertical inner wall 35, so that a central overflow opening 36 is defined within inner wall 35, and a depressed, peripheral media trough 37 is defined between outer wall 34 and inner wall 35. Inner wall 35 includes a solid upper portion 49 and a perforated lower portion 46. A water directing flange 50 is attached to the upper end of perforated lower portion 46, and extend partially across trough 37. A supporting flange 38 is arranged around the top rim of outer wall 34. A bottom 39 is arranged around trough 37.

Top tray 32 includes a closed vertical outer wall 40 and a perforated slanted bottom 41. The lower end of slanted bottom 41 is connected to the lower end of outer wall 40. A central overflow opening 42 is thus defined inside slanted bottom 41, and a depressed, peripheral debris trough 43 is defined between outer wall 40 and slanted bottom 41. A supporting flange 44 is arranged around the top rim of outer wall 40. A handle 45 is attached across opening 42. Outer wall 40 and slanted bottom 41 of top tray 32 are respectively shorter than outer wall 34 and inner wall 35 of bottom tray 30.

FIG. 6:

The filter is shown assembled and positioned in storm drain 31 in a top perspective view in FIG. 6. Flange 38 is supported on a shoulder 47 of storm drain 31, and flange 44 is supported on flange 38. Storm drain 31 would be installed in the ground (not shown) so that its rim is flush with the ground surface. A grate (not shown) would also be positioned within the opening of storm drain 31 on top of the filter.

FIG. 7:

The filter is shown in a side sectional view in FIG. 7. Top tray 32 is sized to slide into trough 37 of bottom tray 30. Because top tray 32 is shorter in height than bottom tray 30, a media receiving chamber 48 is defined between perforated slanted bottom 41 of top tray 32 and bottom 39 of bottom tray 30. Loose filter media 33 is positioned in media receiving chamber 48. As indicated by the dashed arrows, water entering storm drain 31 flows into trough 43, passes through perforated slanted bottom 41, filter media 33, perforated vertical lower portion 46, central overflow opening 36, and down storm drain 31. Large particles and debris are filtered from the water by perforated slanted bottom 41. Because bottom 41 is slanted, debris and particles are collected at the bottom of trough 43 of top tray 32. The upper portion of perforated slanted bottom 41 would thus remain unclogged for a longer period of time. Further, the water is distributed around trough 43, which is large enough so that even if some areas are blocked by debris, the water can still drain through other relatively clear areas.

Small particles, hydrocarbons, and other contaminants are filtered by filter media 33. After the water is passed through perforated slanted bottom 41, it is directed to the outer perimeter of media receiving chamber 48 by water directing flange 50, so that it is passed through as much filer media 33 as possible before being drained through perforated lower portion 46 for maximizing filtration efficiency. Silt is collected on bottom 39, so that perforated lower portion 46 is kept clear to prevent clogging. Bottom 39 is slanted downwardly in the inward direction for enhancing drainage. Filter media 33 is completely enclosed within media receiving chamber 48 to avoid being dislodged by strong water flow or back flow. When the water flow exceeds the rate at which it may pass through filter media 33, excess water is drained through overflow opening 36.

SUMMARY AND SCOPE

Accordingly, a storm drain filter with a removable debris tray is provided. It filters out debris, hydrocarbons, and other contaminants from water runoff flowing into a storm drain. It maximizes the flow rate despite the presence of debris. It keeps the filtering media in position even when water flow is high and turbulent, or when the drain is backed up. It also enables debris to be easily and quickly removed.

Although the above description is specific, it should not be considered as a limitation on the scope of the invention, but only as an example of the preferred embodiment. Many substitutes and variations are possible within the teachings of the invention. For example, the loose filter media may be replaced with filter cartridges. Any suitable filter media may be used. The outer walls and inner walls may be round instead of rectangular, so that they define round central overflow openings and annular troughs. In the second embodiment, the slanted surface of the top debris tray may be either a bottom or an inner wall. The filter may be used in any type of drain. The handle may be of other shapes, and it may be attached to other positions on the top tray.

Therefore, the scope of the invention should be determined by the appended claims and their legal equivalents, not by the examples given.

I claim:

1. A drain filter, comprising:

a bottom media tray including an outer rim, a concentric inner rim, a depressed media trough comprising a continuous concave surface connected between and projecting below said outer rim and said inner rim thereof for receiving filter media, and a central overflow opening inward of said depressed peripheral media trough for draining excess runoff, said depressed media trough including a perforated surface; and a top debris tray including an outer rim, a concentric inner rim, a depressed debris trough comprising a continuous concave surface connected between and protecting below said outer rim and said inner rim thereof for collecting debris, and a central overflow opening inward of said depressed peripheral debris trough for draining excess runoff, said depressed debris trough including a perforated surface, said top debris tray being removably positioned on top of said bottom media tray thus defining a media receiving chamber in between for enclosing said filter media, said top debris tray being removable from said bottom media tray for emptying said debris and enabling inspection and replacement of said filter media, said depressed debris trough for holding said debris securely therein while said top debris tray is being lifted, so that said debris is prevented from falling into said bottom media tray.

2. The drain filter of claim 1, further including a handle attached to said top debris tray for easy removal thereof.

3. The drain filter of claim 1, further including a bottom flange arranged around said bottom media tray for engaging a rim of a drain, and a top flange arranged around said top debris tray, said top flange engaging said bottom flange of said bottom media tray.

4. A drain filter, comprising:

a bottom media tray including an outer rim, a concentric inner rim, a depressed peripheral media trough comprising a continuous concave surface connected between and projecting below said outer rim and said inner rim thereof for receiving filter media, and a central overflow opening inward of said depressed peripheral media trough for draining excess runoff, said depressed peripheral media trough including a perforated surface; and a top debris tray including an outer rim, a concentric inner rim, a depressed peripheral debris trough comprising a continuous concave surface connected between and projecting below said outer rim and said inner rim thereof for collecting debris, and a central overflow opening inward of said depressed peripheral debris trough for draining excess runoff, said depressed peripheral debris trough including a perforated surface, said debris trough of said top debris tray being narrower and shallower than said media trough of said bottom media tray, said top debris tray being removably positioned within said bottom media tray thus defining a media receiving chamber in between for enclosing said filter media, said top debris tray being removable from said bottom media tray for emptying said debris and enabling inspection and replacement of said filter media, said depressed peripheral debris trough for holding said debris securely therein while said top debris tray is being lifted, so that said debris is prevented from falling into said bottom media tray.

5. The drain filter of claim 4, further including a handle attached to said top debris tray for easy removal thereof.

6. The drain filter of claim 4, further including a bottom flange arranged around said bottom media tray for engaging a rim of a drain, and a top flange arranged around said top debris tray, said top flange engaging said bottom flange of said bottom media tray.

7. A drain filter, comprising:

a bottom media tray comprising a closed outer wall, a closed perforated inner wall, and a bottom connecting lower ends of said outer wall and said perforated inner wall thereof, a peripheral media trough defined between said outer wall and said perforated inner wall for receiving filter media, and a central overflow opening defined within said perforated inner wall for draining excess runoff, said perforated inner wall for directing runoff into said central overflow opening; and a top debris tray comprising a closed outer wall, a perforated tapered annular bottom with an outer edge connected to a lower end of said outer wall and an inner edge substantially higher than said outer edge thereof, a depressed peripheral debris trough defined between said outer wall and said perforated tapered annular bottom for collecting debris, and a central overflow opening inward of said annular bottom for draining excess runoff, said debris trough of said top debris tray being narrower and shallower than said media trough of said bottom media tray, said top debris tray being removably positioned within said bottom media tray, said perforated slanted bottom of said top debris tray spaced above said bottom of said bottom media tray thereby defining a media receiving chamber in between for enclosing said filter media, said top debris tray being removable from said bottom media tray for emptying said debris while leaving said filter media in said bottom media tray, said peripheral debris trough of said top debris tray for containing said debris and preventing said debris from falling out during removable of said top debris tray from said bottom media tray.

8. The drain filter of claim 7, further including a water directing flange attached to an inner side of said depressed peripheral media trough and extending partially across said depressed peripheral media trough, said water directing flange for directing water to an outer perimeter of said filter media for maximizing filtration.

9. The drain filter of claim 7, further including a handle attached to said top debris tray for easy removal thereof.

10. The drain filter of claim 7, further including a bottom flange arranged around said bottom media tray for engaging a rim of a drain, and a top flange arranged around said top debris tray, said top flange engaging said bottom flange of said bottom media tray.

* * * * *